United States Patent
Grosskruetz (12)

(10) Patent No.: US 8,640,758 B1
(45) Date of Patent: Feb. 4, 2014

(54) TRACER WIRE APPLICATOR APPARATUS AND METHOD

(76) Inventor: John J. Grosskruetz, Plymouth, WI (US)

(*) Notice: Subject to any disclaimer, the term of this patent is extended or adjusted under 35 U.S.C. 154(b) by 313 days.

(21) Appl. No.: 13/174,922

(22) Filed: Jul. 1, 2011

(51) Int. Cl.
*B29C 65/50* (2006.01)

(52) U.S. Cl.
USPC ........... 156/523; 156/577; 156/574; 156/579; 156/581; 156/582

(58) Field of Classification Search
USPC .......... 156/523, 574, 577, 579, 581, 582, 176
See application file for complete search history.

(56) References Cited

U.S. PATENT DOCUMENTS

| | | | |
|---|---|---|---|
| 3,175,679 A * | 3/1965 | Bratz | 206/389 |
| RE30,393 E | 9/1980 | Sherlock | |
| 4,415,400 A * | 11/1983 | Rammelmeyr | 156/555 |
| 5,948,201 A | 9/1999 | Alveskog | |
| 2006/0266464 A1* | 11/2006 | White | 156/247 |
| 2010/0300625 A1* | 12/2010 | Hardy | 156/527 |

* cited by examiner

*Primary Examiner* — George Koch
(74) *Attorney, Agent, or Firm* — Donald J. Ersler

(57) ABSTRACT

A tracer wire applicator preferably includes a base frame, a wire spindle, a tape spindle and a pipe roller. The base frame preferably includes a base frame member, a support frame member and an upper frame member. One end of the upper frame member is removably secured to one end of the base frame member. One end of the support frame member is removably attached to the base frame member and the other end is attached to the upper frame member. The pipe roller is rotatably retained on the other end of the base frame member. The tape spindle extends from the base frame member to rotatably receive a roll of tape. A wire spindle extends from the base frame member to rotatably receive a wire reel. A wire guide tube is preferably retained by the upper frame member.

6 Claims, 5 Drawing Sheets

TRACER WIRE APPLICATOR APPARATUS AND METHOD

BACKGROUND OF THE INVENTION

1. Field of the Invention

The present invention relates generally to pipes with tracer wires and more specifically to a tracer wire applicator apparatus and method, which allows a tracer wire to be applied to a pipe in an earthen trench.

2. Discussion of the Prior Art

Reissue patent no. RE 30,393 to Sherlock discloses a plastic pipe construction. U.S. Pat. No. 5,948,201 to Alveskog discloses a method and means for affixing a double sided adhesive tape onto an electric conduit and use thereof. Patent application publication no. 2006/0266464 to White discloses a filament tape system & method thereof.

Accordingly, there is a clearly felt need in the art for a tracer wire applicator apparatus and method, which allows a tracer wire to be applied to a pipe in an earthen trench for locating a pipe once it is covered or which allows a tracer wire to be manually applied to a pipe.

SUMMARY OF THE INVENTION

The present invention provides a tracer wire applicator apparatus and method, which allows a tracer wire to be manually applied to a pipe. The tracer wire applicator preferably includes a base frame, a wire spindle, a tape spindle and a pipe roller. The base frame preferably includes a base frame member, a support frame member and an upper frame member. The upper frame member preferably includes a curved shape. One end of the upper frame member is removably retained on one end of the base frame member. One end of the support frame member is removably secured to the base frame member and the other end is attached to the upper frame member. Preferably, one end of a handle plate extends from the support frame member and a handle extends from the other end of the handle plate.

The pipe roller is rotatably retained on the other end of the base frame member. The tape spindle is located between the pipe roller and the support frame member. A tape roll is rotatably retained on the tape spindle. The wire spindle is located between the support frame member and the one end of the base frame member. A wire reel is rotatably retained on the wire spindle. A wire guide tube is retained in the upper frame member. One end of the wire guide tube is positioned to receive wire from the wire reel and the other end of the wire guide tube is positioned adjacent a middle of the pipe roller.

In use, the tape roll is placed on the tape spindle, such that a non-adhesive side of the tape is in contact with an outer perimeter of the pipe roller. An end of the tape is rolled around the pipe roller, until the tape is aligned with the other end of the wide guide tube. The wire reel is placed on the wire spindle. An end of the wire on the wire spindle is inserted through the wire guide tube, until the end of the wire is flush with the end of the tape. The tracer wire applicator is grasped by both hands. The tracer wire applicator is then positioned, such that the outer perimeter of the pipe roller is placed in contact with a pipe. The tracer wire applicator is then pulled along a length of the pipe to apply the tape and wire thereto.

Accordingly, it is an object of the present invention to provide a tracer wire applicator apparatus and method, which allows a tracer wire to be manually applied to a pipe.

Finally, it is another object of the present invention to provide a tracer wire applicator apparatus and method, which allows a tracer wire to be applied to a pipe in an earthen trench for locating a pipe once it is covered.

These and additional objects, advantages, features and benefits of the present invention will become apparent from the following specification.

DETAILED DESCRIPTION OF THE PREFERRED EMBODIMENTS

Figure 1:
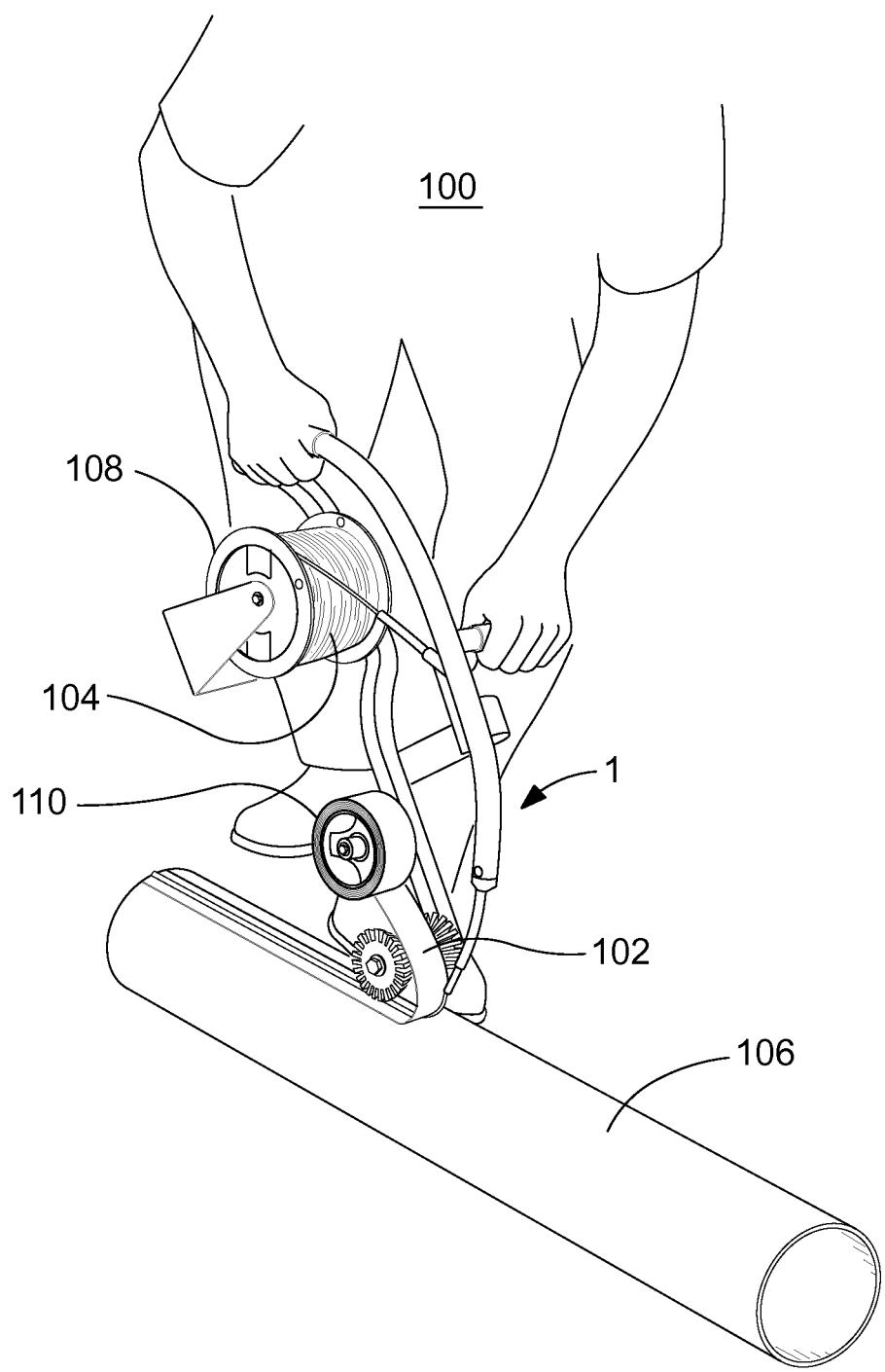
FIG. 1 is a perspective view of a user applying tape and a tracer wire to a pipe with a tracer wire applicator in accordance with the present invention.
Figure 2:
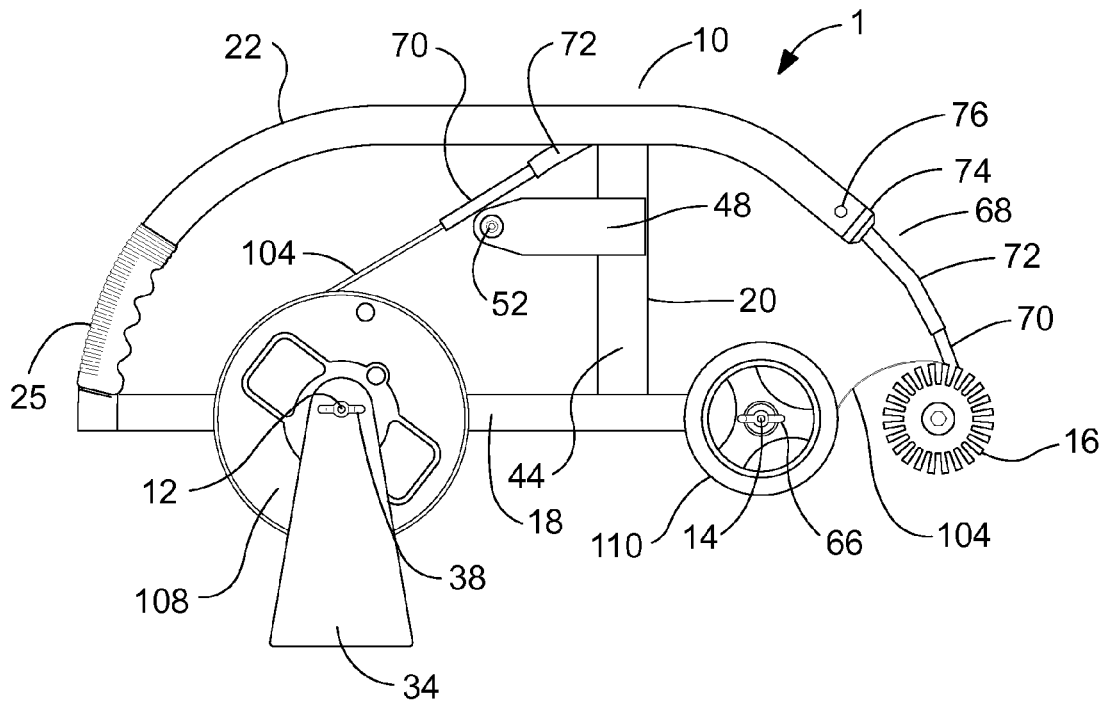
FIG. 2 is a right side view of a tracer wire applicator in accordance with the present invention.
Figure 3:
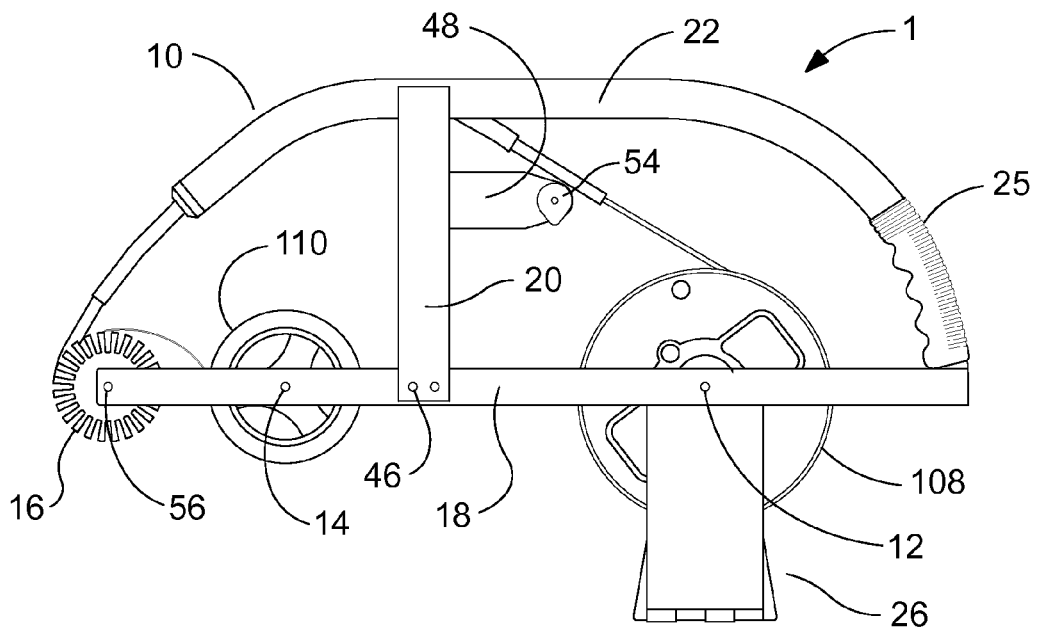
FIG. 3 is a left side view of a tracer wire applicator in accordance with the present invention.
Figure 4:
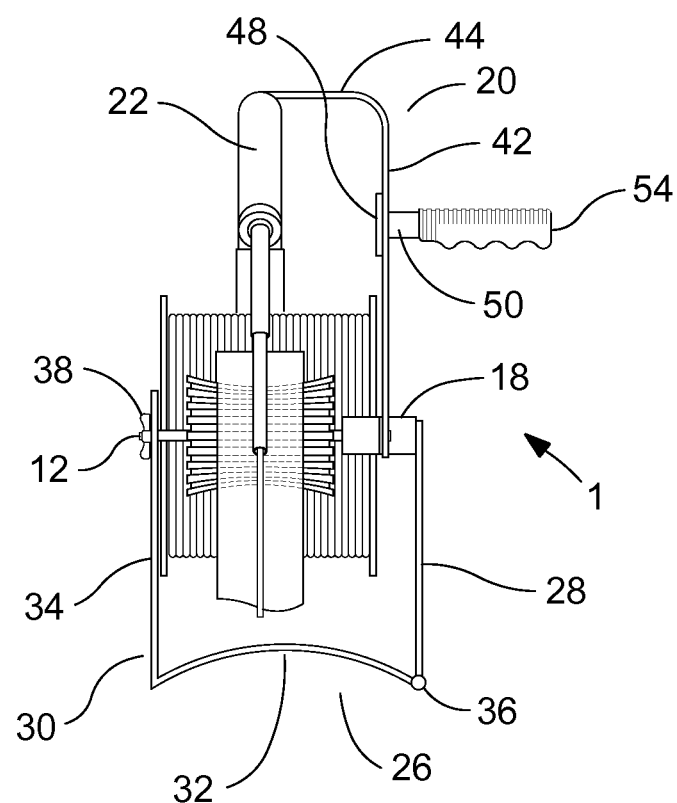
FIG. 4 is a front end view of a tracer wire applicator in accordance with the present invention.
Figure 5:
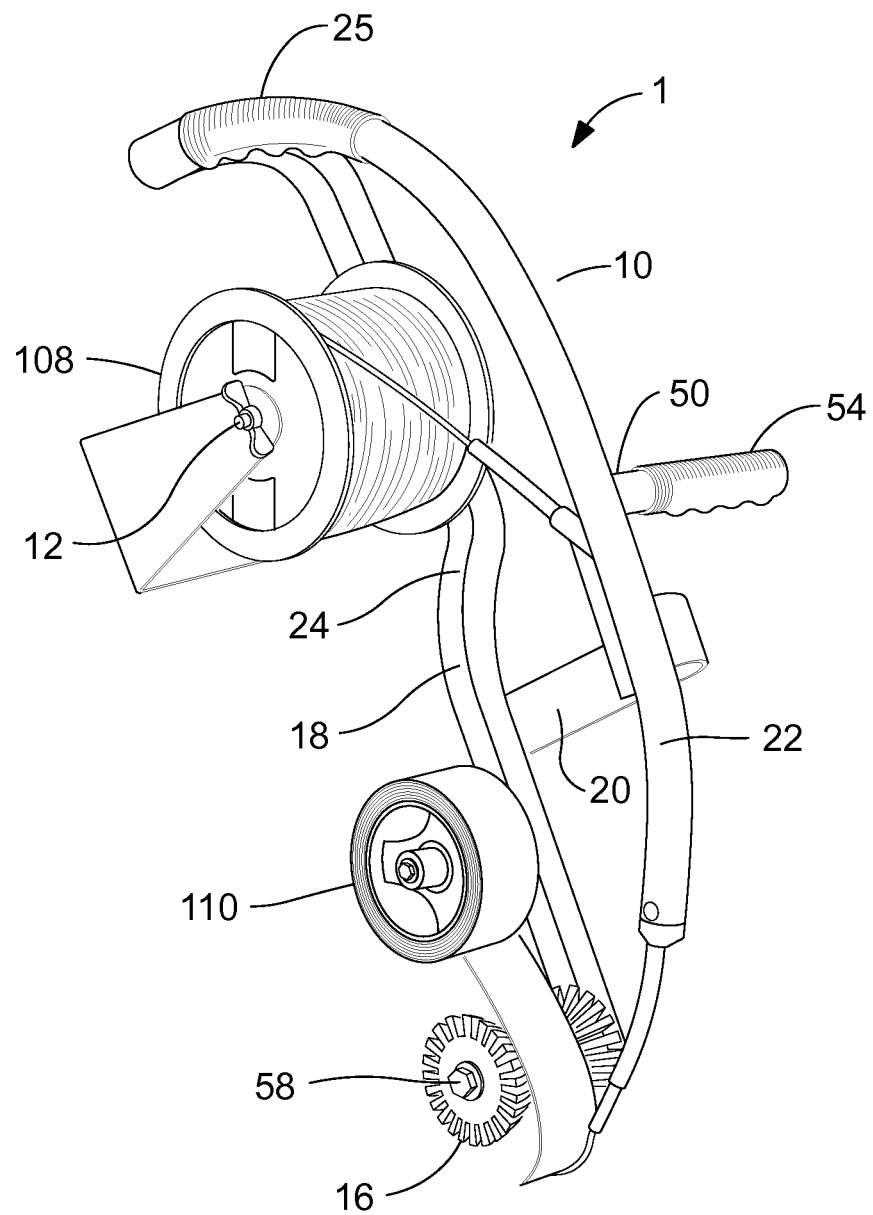
FIG. 5 is a perspective view of a tracer wire applicator in accordance with the present invention.

With reference now to the drawings, and particularly to FIG. 1, there is shown a perspective view of a user 100 applying tape 102 and a tracer wire 104 to a pipe 106 with a tracer wire applicator 1. With reference to FIGS. 2-5, the tracer wire applicator 1 preferably includes a base frame 10, a wire spindle 12, a tape spindle 14 and a pipe roller 16. The base frame 10 preferably includes a base frame member 18, a support frame member 20 and an upper frame member 22. The upper frame member 22 preferably includes a curved shape and a tubular cross section. One end of the upper frame member 22 is removably retained on the one end of the base frame member 18 with any suitable structure. An example of a suitable structure would be a projection extending from the one end of the base frame member 18, which is sized to be slidably received by the tubular cross section of the upper frame member 22. A hand grip 25 is preferably slid on to the one end of the upper frame member 22, before thereof is secured to the base frame member 18. The one end of the base frame member 18 includes an offset portion 24. The wire spindle 12 extends from substantially a middle of the offset portion 24. The offset portion 24 is provided to center a width of a wire reel 108 relative to the upper frame member 22. The wire spindle 12 is inserted into a spindle hole of the wire reel 108.

An applicator rest bracket 26 includes a base plate 28 and a support bracket 30. The support bracket includes a pipe contact leg 32 and a support leg 34. The pipe contact leg 32 includes a curved cross section for resting on a round shaped pipe. The support leg 34 extends upward from one end of the pipe contact leg 32. The other end of the support leg 34 is formed into a portion of a hinge and a bottom of the base plate 28 is formed into a mating hinge portion. A hinge pin 36 is inserted into the hinge and mating portions to pivotally engage the base plate 28 with the support leg 34. A top of the base plate 28 is preferably attached to the base frame member 18 with welding or fasteners. A hole is formed through the support leg 34 to receive an end of the wire spindle 12. A thread is preferably formed on an end of the wire spindle 12 to threadably receive a wing nut 38 or the like. The support leg 34 is removed from the wire spindle 12 for the installation or removal of the wire reel 108.

The support frame member 20 includes a support leg 42 and a cross leg 44. One end of the support leg 42 is preferably attached to the base frame member 18 with fasteners 46. The cross leg 44 is preferably welded to the upper frame member 22. One end of a handle plate 48 is attached to the support leg 44 with welding or the like. A handle 50 is secured to the other end of the handle plate 48 with a fastener 52. A handle grip 54 is preferably slid on to the handle 50.

Figure 6:
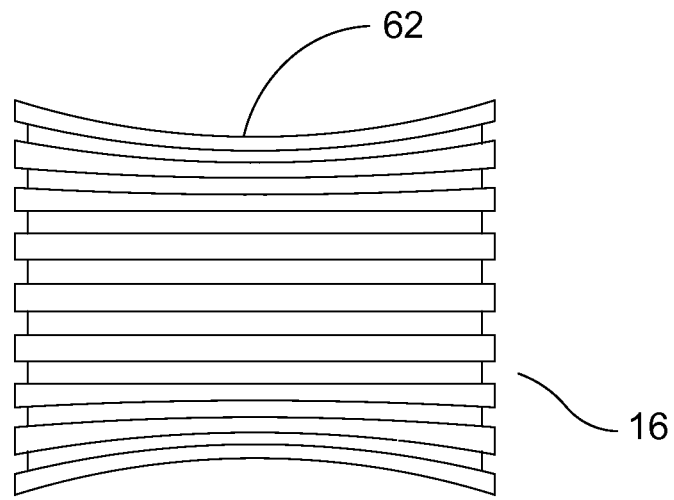
FIG. 6 is a front view of a pipe roller of a tracer wire applicator in accordance with the present invention.
Figure 7:
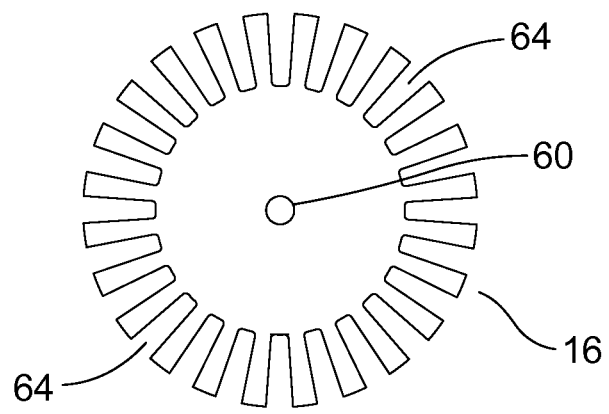
FIG. 7 is an end view of a pipe roller of a tracer wire applicator in accordance with the present invention.

The pipe roller 16 is rotatably retained on the other end of the base frame member 18 with a roller spindle 56 and a fastener 58 or the like. With reference to FIGS. 6-7, the roller spindle 56 is inserted into a spindle hole 60 of the pipe roller 16. The pipe roller 16 is axially retained with the fastener 58. The pipe roller 16 preferably includes a concave profile 62 to receive an outer diameter of a round shaped pipe. A plurality of slots 64 are preferably formed in a circumference of the pipe roller 16. The plurality of slots 64 facilitate the flexing of the pipe roller 16 for different diameter of pipes. The plurality of slots 64 also allow the tape to be attached to a pipe with some moisture thereon. The moisture pushes a portion of the tape 102 into the plurality of slots 64.

The tape spindle 14 extends from the base frame 18. The tape spindle 14 is located between the pipe roller 16 and the support frame member 20. A tape roll 110 is rotatably retained on the tape spindle 14. The tape roll 110 is preferably axially secured on the tape spindle 14 with a wing nut 66 or the like. A wire guide tube 68 is preferably retained in the upper frame member 22. The wire guide tube 68 preferably includes a flexible tube 70, a rigid tube 72 and a retention plug 74. The retention plug 74 includes a bore which is sized to slidably receive the rigid tube 72. A portion of an outer diameter of the retention plug 74 is sized to be received by an inner perimeter of the upper frame member 22.

The flexible tube 70 is inserted into the rigid tube 72. One end of the flexible tube 70 preferably extends from one end of the rigid tube 72 to receive the wire 104. The wire 104 preferably includes at least one conductive wire and an insulated outer cover. The other end of the flexible tube 70 preferably extends from the other end of the rigid tube 72, adjacent the outer perimeter of the pipe roller 16. An angular hole is formed through the upper frame member 22 for insertion of the rigid tube 72. The rigid tube 72 is inserted through the angular hole and out of the other end of the upper frame member 22. The retention plug 74 is slid over the rigid tube 72 and inserted into the other end of the upper frame member 22.

However, the rigid tube 72 does not have to be inserted into the upper frame member 22, but may be retained relative to the base frame 10 with any suitable structure. The flexible tube 70 bends to accommodate the wire 104 unreeling from the wire reel 108. The flexible tube 70 is preferably fabricated from a polyurethane material, but other materials may also be used. The rigid tube 72 is preferably fabricated from stainless steel to prevent corrosion. A fastener 76 is threaded through the upper frame member 22, the retention plug 74 and into a side of the rigid tube 72 to axially retain the rigid tube 72 relative to the frame member 22.

In use, the tape roll 110 is secured to the tape spindle 14, such that a non-adhesive side of the tape 102 is in contact with an outer perimeter of the pipe roller 16. An end of the tape 102 is rolled around the pipe roller 16, until the tape 102 is aligned with the other end of the wire guide tube 68. The wire reel 108 is secured to the wire spindle 12. An end of the wire on the wire spindle is inserted through the wire guide tube 68, until the end of the wire is flush with the end of the tape 102. The hand grips 25, 54 of the tracer wire applicator 1 are grasped by both hands. The tracer wire applicator 1 is then positioned, such that the outer perimeter of the pipe roller 16 is placed in contact with the pipe 106. The tracer wire applicator 1 is then pulled along a length of the pipe 106 to apply the tape 102 and the wire 104 thereto. After the wire 104 is attached to the pipe 106 with the tape 102, a voltage is applied across the wire 104 from one end of the pipe 106 to the other end of the pipe 106 to verify continuity of the wire 104.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tracer wire applicator comprising:
   a base frame includes a base frame member, a support frame member and a upper frame member, one end of said base frame is removably attached to one end of said upper frame member, one end of said support frame member is removably attached to said base frame, the other end of said support frame member is attached to said upper frame member, said upper frame member having a substantially curved portion and a tubular cross section;
   a wire spindle is retained on substantially one end of said base frame to rotatably retain a wire reel;
   a tape spindle is retained on substantially the other end of said base frame to rotatably retain a tape roll;
   a pipe roller is rotatably retained on the other end of said base frame; and
   a wire guide tube is retained by said base frame, one end of said wire guide tube receives wire from the wire reel, the other end of said wire guide tube is located adjacent said pipe roller, said wire guide tube includes a flexible tube and a rigid tube, said flexible tube extends from each end of said rigid tube, a portion of said wire guide tube is retained in said tubular cross section, wherein the tape from the tape roll is placed in contact with an outer perimeter of said pipe roller, the wire from the wire reel is placed in contact with an adhesive side of the tape.

2. The tracer wire applicator of claim 1, further comprising:
   an application rest bracket includes a base plate and a support bracket, one end of said base plate is attached to said base frame, one end of said support bracket is retained on said wire spindle, the other end of said support bracket is pivotally retained by the other end of said base plate.

3. A tracer wire applicator comprising:
   a base frame includes a base frame member, a support frame member and a upper frame member, one end of said base frame is removably attached to one end of said upper frame member, one end of said support frame member is removably attached to said base frame, the other end of said support frame member is attached to said upper frame member, said upper frame member having a substantially curved portion and a tubular cross section;
   a handle extends from said support frame member;
   a wire spindle is retained on substantially one end of said base frame to rotatably retain a wire reel;
   a tape spindle is retained on substantially the other end of said base frame to rotatably retain a tape roll;
   a pipe roller is rotatably retained on the other end of said base frame; and a wire guide tube is retained by said base frame, one end of said wire guide tube receives wire from the wire reel, the other end of said wire guide tube is located adjacent said pipe roller, said wire guide tube includes a flexible tube and a rigid tube, said flexible tube extends from each end of said rigid tube, a portion of said wire guide tube is retained in said tubular cross section, wherein the tape from the tape roll is placed in contact with an outer perimeter of said pipe roller, the wire from the wire reel is placed in contact with an adhesive side of the tape.

4. The tracer wire applicator of claim 3, further comprising:
an application rest bracket includes a base plate and a support bracket, one end of said base plate is attached to said base frame, one end of said support bracket is retained on said wire spindle, the other end of said support bracket is pivotally retained by the other end of said base plate.

5. A tracer wire applicator comprising:
a base frame includes a base frame member, a support frame member and a upper frame member, one end of said base frame is removably attached to one end of said upper frame member, one end of said support frame member is removably attached to said base frame, the other end of said support frame member is attached to said upper frame member, said upper frame member having a substantially curved portion and a tubular cross section, substantially one end of said base frame is offset to center a wire reel relative to said upper frame member;
a handle extends from said support frame member;
a wire spindle is retained on substantially one end of said base frame to rotatably retain a wire reel;
a tape spindle is retained on substantially the other end of said base frame to rotatably retain a tape roll;
a pipe roller is rotatably retained on the other end of said base frame; and
a wire guide tube is retained by said base frame, one end of said wire guide tube receives wire from the wire reel, the other end of said wire guide tube is located adjacent said pipe roller, said wire guide tube includes a flexible tube and a rigid tube, said flexible tube extends from each end of said rigid tube, a portion of said wire guide tube is retained in said tubular cross section, wherein the tape from the tape roll is placed in contact with an outer perimeter of said pipe roller, the wire from the wire reel is placed in contact with an adhesive side of the tape.

6. The tracer wire applicator of claim 5, further comprising:
an application rest bracket includes a base plate and a support bracket, one end of said base plate is attached to said base frame, one end of said support bracket is retained on said wire spindle, the other end of said support bracket is pivotally retained by the other end of said base plate.

* * * * *

UNITED STATES PATENT AND TRADEMARK OFFICE
CERTIFICATE OF CORRECTION

PATENT NO.       : 8,640,758 B1                                  Page 1 of 1
APPLICATION NO.  : 13/174922
DATED            : February 4, 2014
INVENTOR(S)      : John J. Grosskreutz It is certified that error appears in the above-identified patent and that said Letters Patent is hereby corrected as shown below:

On the Title Page, Item (12), "Grosskruetz" should read -- Grosskreutz --.

On the Title Page, Item (76), "John J. Grosskruetz" should read -- John J. Grosskreutz --.

Signed and Sealed this
Eighteenth Day of March, 2014

Michelle K. Lee
*Deputy Director of the United States Patent and Trademark Office*